United States Patent [19]

Honerkamp et al.

[11] Patent Number: 4,753,664
[45] Date of Patent: Jun. 28, 1988

[54] REBOILER SYSTEM FOR GLYCOL DEHYDRATION HAVING IMPROVED THERMAL EFFICIENCY

[75] Inventors: Joseph D. Honerkamp; Harold O. Ebeling, both of Tulsa, Okla.

[73] Assignee: Lecco, Inc., Tulsa, Okla.

[21] Appl. No.: 886,065

[22] Filed: Jul. 16, 1986

[51] Int. Cl.$^4$ ............................................. B01D 53/14
[52] U.S. Cl. ............................................ 55/174; 55/32
[58] Field of Search ............................ 55/32, 171–177; 159/16.1, 47.3

[56] References Cited

U.S. PATENT DOCUMENTS

| | | | |
|---|---|---|---|
| 3,162,515 | 12/1964 | Connors et al. | 55/32 |
| 3,234,108 | 2/1966 | Hull | 55/32 |
| 3,397,731 | 8/1968 | Gravis et al. | 55/32 |
| 3,616,598 | 11/1971 | Foral | 55/32 |
| 3,867,112 | 2/1975 | Honerkamp et al. | 55/32 |

*Primary Examiner*—Charles Hart
*Attorney, Agent, or Firm*—Head & Johnson

[57] ABSTRACT

A reboiler for dehydrating glycol used in a gas dehydration system having improved thermal efficiency including a horizontal boiler vessel, a horizontal heater within the boiler vessel having a fuel burner therein, a heat exchange vessel extending downwardly from the boiler vessel including piping to receive heated glycol therein from the interior of the boiler vessel and a heat exchange conduit within the heat exchange vessel extending exteriorly of it, one end of the heat exchange conduit communicating with the interior of the boiler vessel to transfer wet glycol into the boiler vessel and a glycol inlet at one end of the conduit extending externally of the vessel and the heat exchange vessel having a dehydrated glycol outlet, hot dehydrated glycol from the boiler vessel passing downwardly through the heat exchange vessel to thoroughly exchange heat with the incoming wet glycol to thereby conserve heat applied to the glycol for dehydration.

4 Claims, 4 Drawing Sheets

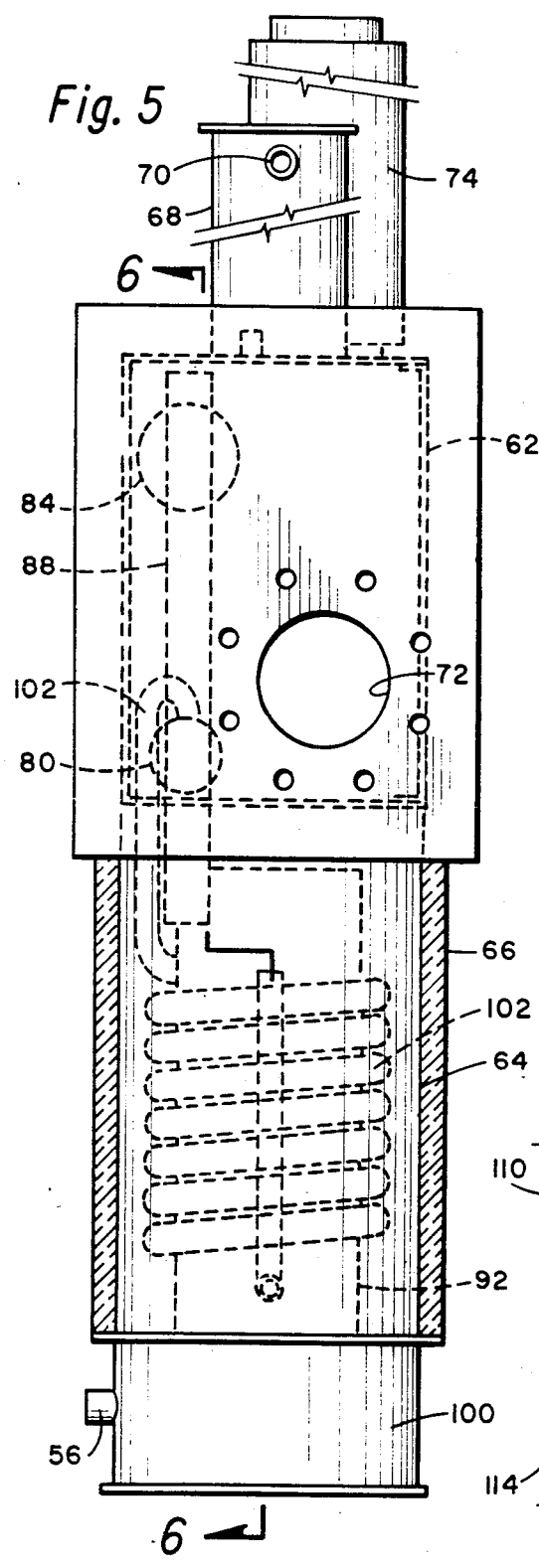
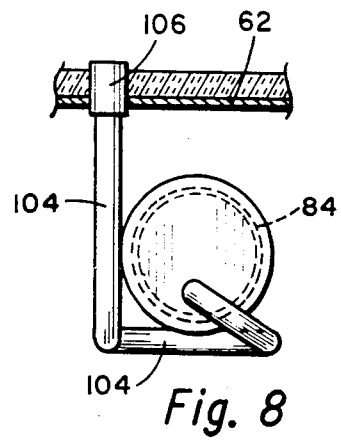
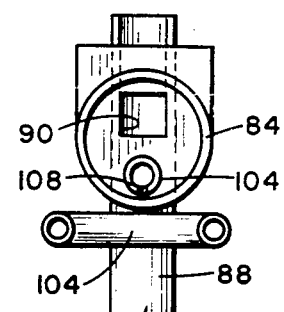

REBOILER SYSTEM FOR GLYCOL DEHYDRATION HAVING IMPROVED THERMAL EFFICIENCY

SUMMARY OF THE INVENTION

An important method of treating natural gas to remove entrained water vapor is by glycol dehydration. When gas laden with water is mixed with liquid glycol, the water is absorbed by the glycol, permitting the gas, free of water, to pass upwardly out of the liquid glycol. To continually reuse glycol for dehydration, it must be heated to a preselected temperature level to boil off the water. Since water has a higher vapor pressure than glycol, by properly controlling the temperature of the wet glycol, the water can be boiled off without vaporizing the glycol which remains in liquid state to thereby achieve dehydrated glycol. Thus, the glycol can be recycled for continuous reuse to dehydrate gas.

For background reference to the use of glycol for dehydration, reference may be had to the following U.S. patents: U.S. Pat. Nos. 4,375,977 "System of Gas Dehydration Using Liquid Dessicant"; 4,432,779 "System of Gas Dehydration Using Liquid Desiccants"; 4,4551,157 "Absorber for Dehydrating Gas".

One problem with glycol dehydration is that it consumes energy to reboil the wet glycol to drive off the water so that glycol can be used for further gas dehydration. Since fuel costs have increased dramatically in the last ten years, with prospects that in the long term, fuel will be a scarcer and therefore a more expensive commodity, the amount of fuel required to achieve glycol dehydration of gas becomes an important factor in the overall efficiency and economy of producing natural gas. The present invention improves the efficiency of glycol dehydration by providing a system in which once contact is made between the wet glycol from an absorber with heat applied for purposes of dehydration the glycol is thereafter fully protected in a heat conservation zone until it exchanges heat back with the incoming glycol. More particularly, a system is provided in which hot dehydrated glycol, as it passes back to an absorber, first exchanges heat with incoming wet glycol to thereby salvage heat which would otherwise be lost in the system.

A horizontal reboiler vessel has a first and second opening in the top. Extending from one of the openings is a vertical still column which itself has an opening adjacent the top thereof for the escape of water vapor which is boiled off the glycol in the boiler vessel. A horizontal heater is provided within the boiler vessel having means for burning fuel therein. A vertical exhaust stack is affixed to the burner adjacent one end and extends through a second opening in the boiler to provide an escape to the atmosphere to the products of combustion of fuel within the heater.

A heat exchange vessel is affixed to the exterior of the boiler vessel and extends downwardly from it, preferably adjacent one end of the boiler vessel. A down pipe extends from the interior of the boiler vessel downwardly through the wall thereof and into the interior of the heat exchange vessel. The down pipe is open at its upper end adjacent the upper interior of the boiler vessel and permits hot, dehydrated glycol, to flow from the boiler vessel downwardly into the heat exchange vessel. Within the heat exchange vessel is a concentric tubular vessel of external diameter smaller than the internal diameter of the boiler vessel. The down pipe communicates with the annular area between the exterior of the tubular vessel and the interior of the heat exchange vessel. Within the heat exchange vessel a conduit is coiled exteriorly of the tubular vessel. One end of the conduit extends upwardly and communicates with the interior lower portion of the boiler vessel. The other end of the conduit extends externally of the boiler vessel and provides an inlet so that wet glycol from an absorber flows in the conduit and thereby ultimately into the lower interior of the boiler vessel.

A dehydrated glycol outlet is provided in the lower end of the boiler vessel. Hot dehydrated glycol is passed downwardly into the heat exchange vessel and thoroughly transfers heat thereof to the incoming wet glycol before the dehydrated glycol is conveyed by piping to an absorber. In this manner, a significant portion of the heat of the dehydrated glycol is utilized to heat incoming wet glycol and to thereby conserve heat which would otherwise be lost in the outflowing dehydrated glycol.

The entire boiler vessel and heat exchange vessel are surrounded by a blanket of insulation so that no hot surfaces are unnecessarily exposed to ambient temperatures. In this manner, there are no spurious losses of heat. Everything related to heating the glycol to drive the water therefrom is encapsulated in a warm blanket without hot surfaces being exposed to the atmosphere.

A better understanding of the invention will be had by reference to the following description and claims taken in conjunction with the attached drawings.

DESCRIPTION OF THE DRAWINGS

FIG. 4 is a fragmentary elevational end view as taken along the line 4—4 of FIG. 2.

FIG. 5 is an elevational end view as taken along the line 5—5 of FIG. 2 with some of the internal features of the reboiler shown in dotted outline.

FIG. 7 is a fragmentary, cross-sectional view taken along the line 7—7 of FIG. 3.

FIG. 8 is a fragmentary, cross-sectional view taken along the line 8—8 of FIG. 6.

DETAILED DESCRIPTION OF A PREFERRED EMBODIMENT

Figure 1:
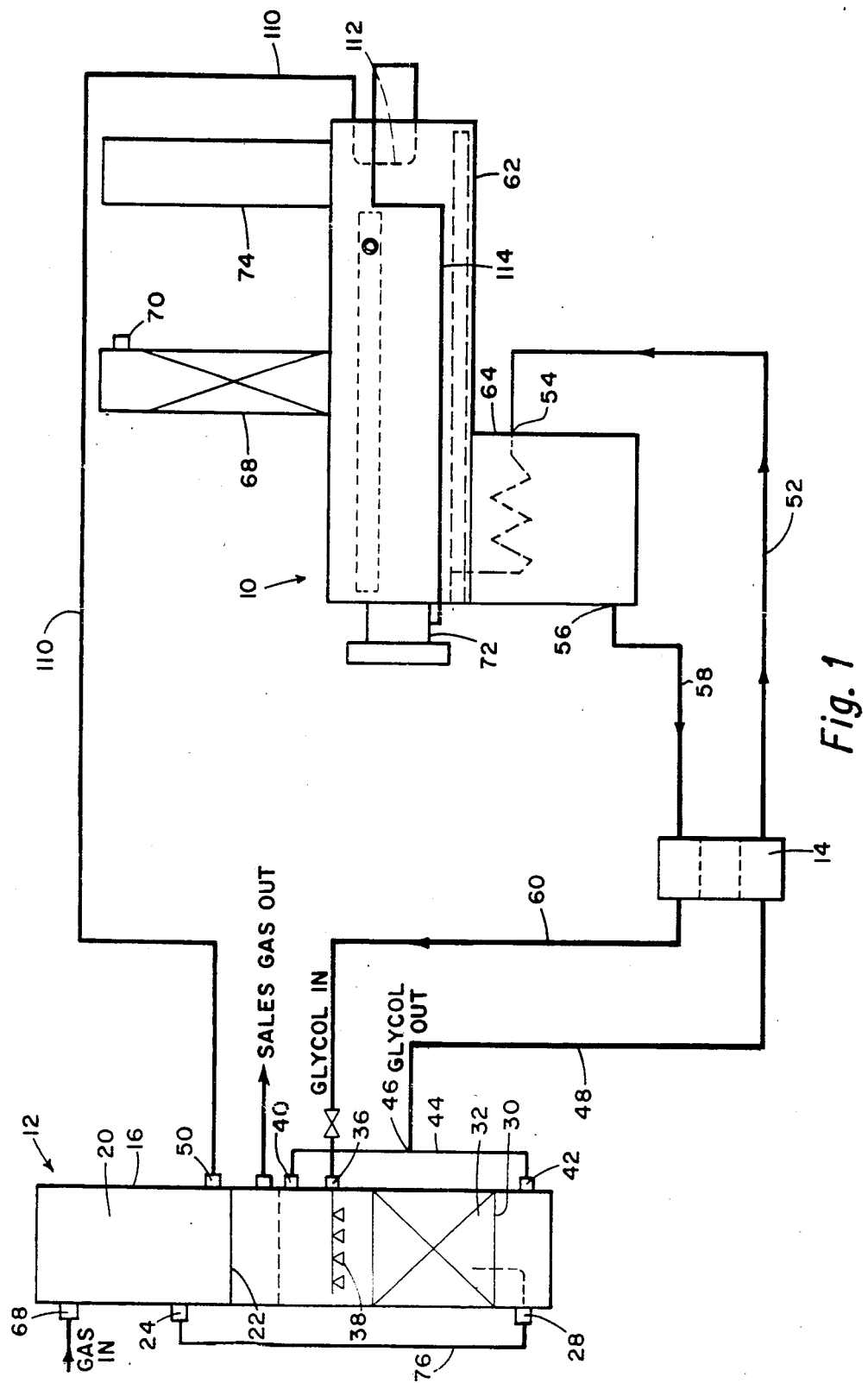
FIG. 1 is a piping drawing showing the energy efficient glycol reboiler of the present invention as connected to a typical absorber as used in the petroleum industry for dehydrating gas.

Referring to the drawings and first to FIG. 1 the improved reboiler of this invention is generally indicated by the numeral 10 and is shown with exemplary piping as it is used in a glycol dehydration system including an absorber 12 and a glycol transfer pump 14. The absorber 12 is illustrated as a means of applying the invention and is a typical absorber as utilized in the petroleum industry. The absorber typically includes an elongated upright vessel 16 having a gas inlet 18 which receives gas produced from gas wells and which gas customarily has with it entrained and absorbed water. It is important that substantially all of the water be removed before the gas is passed to a transmission line, otherwise the water can freeze in winter weather and block the line and, in general, water causes substantial problems if it is not removed.

The vessel 16 is divided into several compartments including a surge chamber 20, by an internal partition 22. Gas flows through the inlet 18 into the surge chamber and then flows through a gas outlet 24, pipe 26 and gas inlet 28 back into the interior of the vessel adjacent the lower end thereof. Within the lower portion of the vessel is a tray 30 which supports packing 32. The lower interior portion of vessel 16 is filled with liquid glycol so that the gas entering through inlet 28 levels upwardly through the glycol, (tray 30 being perforated) and through packing 32. As it bubbles upwardly, the glycol absorbs water from the gas and the gas ultimately passes out of the vessel, substantially free of water, through outlet 34. Fresh, dehydrated glycol flows into the vessel through glycol inlet 36 and by distribution nozzles 38 the dehydrated glycol passes downwardly within the interior of the vessel and through packing 32 as the gas is migrating in the opposite direction, upwardly, within the vessel. By means of glycol outlets 40 and 42 connecting to piping 44, the level of glycol within the absorber is determined. Glycol outlet 40 is an equalization outlet, the height of glycol being controlled by the height of a T fitting 46 which connects to piping 48 to carry wet glycol from the absorber. Thus, dry glycol goes into the absorber through inlet 36 and wet glycol flows out through outlet 42. It is a functoin of the reboiler of this invention to treat this wet glycol so that it can be returned as dehydrated glycol and to do so utilizing a minimum amount of fuel. One other element which forms a part of the absorber 12 which will be discussed subsequently is a fuel gas outlet 48.

Piping 48, as previously indicated, carries wet glycol to pump 14 and from the pump wet glycol is passed by piping 52 to the wet glycol inlet 54 of the reboiler 10. Dehydrated glycol flows out of the reboiler from glycol outlet 56 and by piping 58 to pump 14 and from the pump by piping 60 back to the glycol inlet 36.

Now that the environment has been described in which the reboiler of the invention is typically used, the reboiler itself will be described in detail by reference to FIGS. 2 through 8.

The reboiler 10 includes a generally horizontal boiler vessel 62 and a downwardly extending heat exchange vessel 64. Both vessels 62 and 64 are substantially enshrouded in insulation 66 to conserve thermal energy. Upwardly extending from the boiler vessel 62 is a vertical still column 68 which has an opening 70 therein through which water vapor, having been driven from the glycol within the boiler vessel, is vented to the atmosphere.

Figures 2, 3:
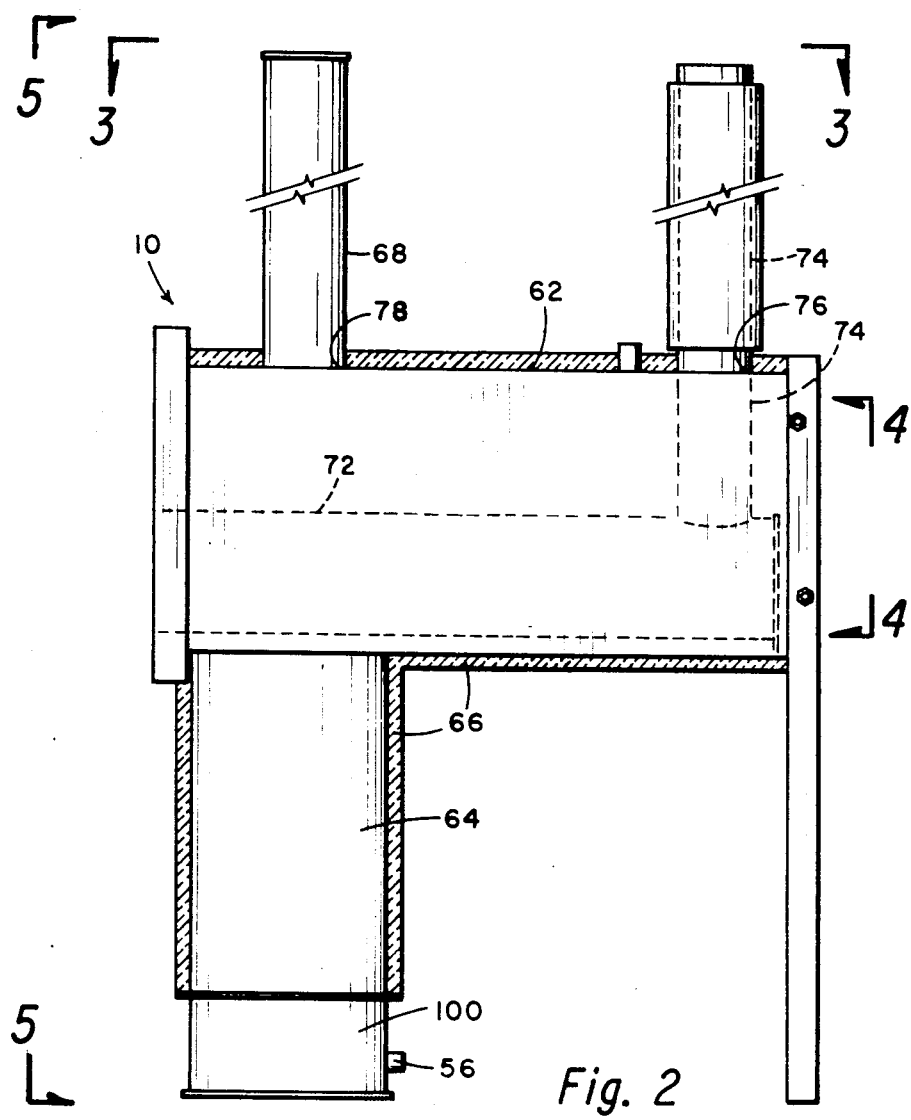
FIG. 2 is an elevational, external view of a reboiler which incorporates the principles of this invention.
FIG. 3 is a top plan view as taken along the line 3—3 of FIG. 2 of the reboiler.

Positioned within the boiler vessel 62 is a horizontal heater 72. Communicating with the heater at one end of the vessel 62 is a vertical exhaust stack 74, the upper end of which communicates with the atmosphere. Within heater 72 fuel is burned, preferably gas, to heat glycol within the vessel 62. The configuration and position of the heater 72 is best seen in FIG. 2 as shown in dotted outline. The exhaust stack passes out of vessel 62 through an exhaust opening 76, and in like manner the vertical still column 68 communicates with the interior of the vessel through an opening 78.

Positioned within the boiler vessel 62, in the lower portion thereof, is an elongated glycol injector tube 80. Wet glycol flows into the interior of vessel 62, in a manner to be described subsequently, and into the injector tube where it flows outwardly through small openings 82 into the interior of the vessel. Within the vessel the glycol is heated to drive absorbed water therefrom. The abosorbed water passes out through still column 68 as steam or water vapor.

Positioned within the upper interior of the vessel is an elongated, horizontal spurging tube 84 which has small diameter openings 86 therein. The hot, dehydrated glycol from within the interior of the vessel passes upwardly through openings 86 into the interior of the spurging tube.

Positioned within the vessel 62, at one end thereof, is a down tube 88, the upper end of which connects through opening 90 (See FIG. 7). The elevation of opening 90 determines the elevation of liquid glycol within the vessel, that portion of the vessel above the elevation established by opening 90 collects water vapor which, as has been previously stated, passes out through still columns 68. Positioned within the interior of the heat exchange vessel 64 is a tubular vessel 92 having exterior dimensions less than the interior dimensions of heat exchange vessel 64. The tubular vessel 92 establishes an annular area 94 within the interior of vessel 64. The lower end of down pipe 88 communicates with this annular area 94. Hot glycol flowing out of the boiler vessel flows downwardly into this annular area 94. An upstanding pipe 96 has a lower end extending through an opening 98 adjacent the lower end of the tubular vessel 92. The upper end 96A of the upstanding pipe 96 is below the upper end 92A of the tubular vessel 92. Hot glycol flows into the interior of tubular vessel 92 by passing out the upper open end of the upstanding pipe 96. A storage compartment 100 is attached to the lower end of the heat exchange vessel 64 to receive dehydrated glycol therein and the glycol outlet 56 communicates with the interior of this storage compartment 100.

The wet glycol inlet 54 connects with a conduit 102 which is coiled within the interior of heat exchange vessel 64 around the tubular vessel 92. The conduit 102 extends upwardly into the interior of boiler vessel 92 and connects with the injector tube 80.

Thus, the wet glycol flowing through inlet 54 is thoroughly heat exchanged with the hot dehydrated glycol in the interior of the heat exchange vessel 64. This extracts heat from the dehydrated glycol, which no longer requires heat since water has already been driven therefrom and applies the heat to the incoming glycol. This heat exchange system thereby effectively maintains the heat applied to the glycol within the boiler vessel 62 and within the heat exchange vessel 64. This achieves a greatly improved overall efficiency and economy of gas dehydration utilizing glycol.

Figure 6:
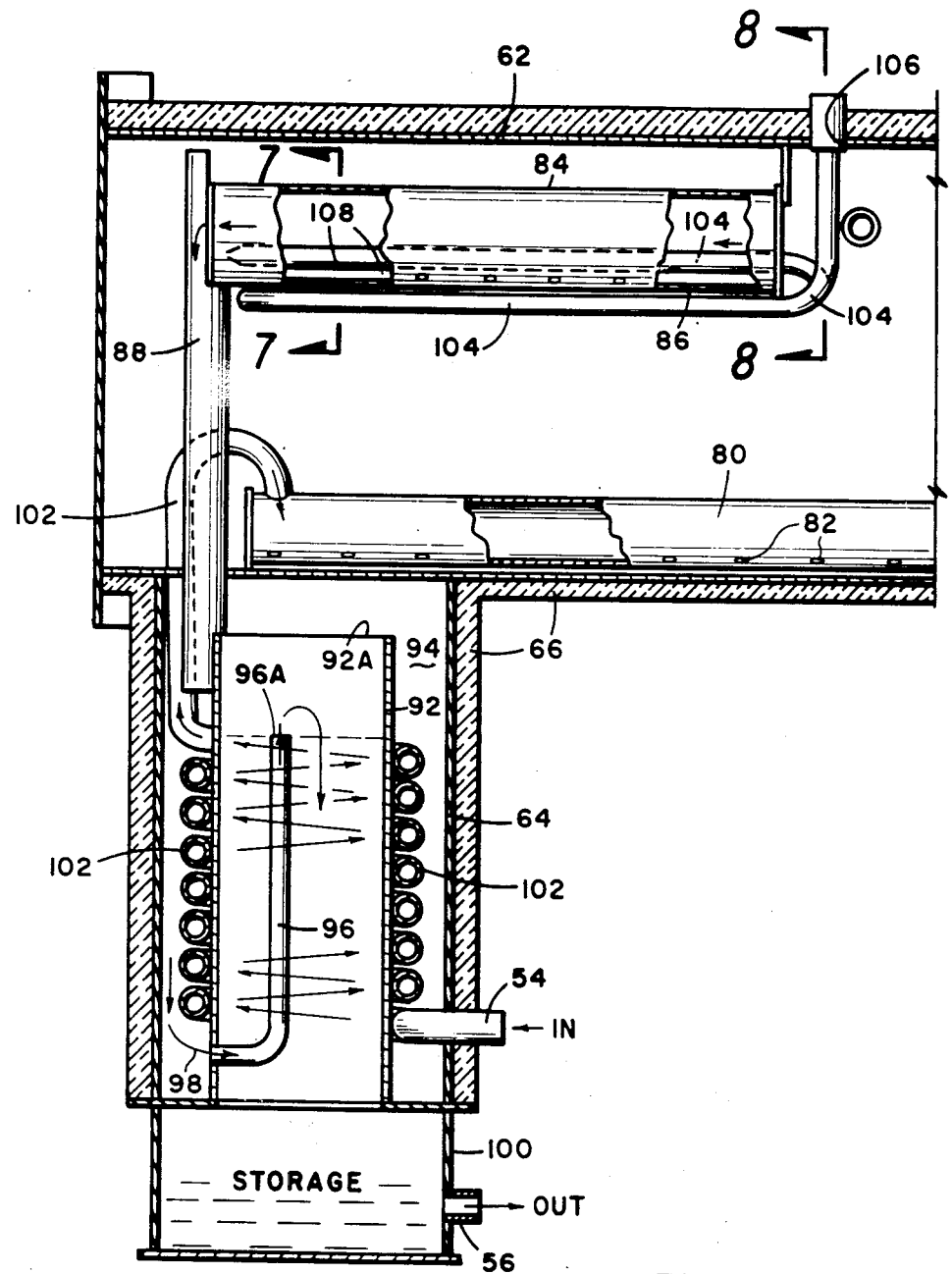
FIG. 6 is a cross-sectional view taken along the line 6—6 of FIG. 5 showing more details of the reboiler.

As seen in FIGS. 6, 7 and 8, an injector tube 104 communicates to the exterior of vessel 62 through opening 106. The tube 104 coils below the sparging tube 84 for one loop and then extends interiorly of the sparging tube. The portion of tube 104 within sparging tube 84 has small diameter openings 108 so that gases are discharged therefrom directly into the interior of the sparging tube. In situations where dry sparging gas is useful, it is introduced through opening 106 into tube 104. Referring to FIG. 1, such gas is available from fuel gas line 110. By the looping of injector tube 104 good heat transfer is obtained with the glycol within the vessel before the gas is injected into the sparging tube.

Referring again to FIG. 1, fuel gas outlet 50 is connected by piping 110 to a coil 112 which is secured at one end of the boiler vessel 62. From piping 110, the gas, after passing through the coil 112 flows by piping 114 into the heater 72 wherein the fuel is consumed.

Thus, the invention provides an improved reboiler for use in a glycol dehydration system in which the heat utilized to drive water from wet glycol is carefully conserved and thoroughly exchanged with incoming wet glycol. Once the wet glycol enters the heat exchange vessel 64 at inlet 54 it is enclosed within the heat protection zone of the system until it exchanges heat back with the incoming glycol as the glycol passes out through outlet 56 as dehydrated and cooled glycol. The system provides no hot surfaces exposed to the exterior. Everything about the reboiler system utilized in connection with driving water from the glycol is encapsulated in a warm blanket. There are no spurious losses of heat.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. For use in a system for extracting entrained water from gas in which wet gas is mixed with a desiccant absorbing the water and the dry gas passing upwardly out of the mixture, a reboiler for heating the wet dessicant to drive the absorbed water therefrom to provide dehydrated liquid dessicant, comprising:

a horizontal boiler vessel;

a horizontal heater within said boiler vessel having means for burner fuel therein;

an upright heat exchange vessel affixed to and extending downwardly from said boiler vessel;

a tubular vessel of exterior diameter less than the interior diameter of said heat exchange vessel centrically positioned within said heat exchange vessel providing an annular area between the tubular vessel and the heat exchange vessel;

means communicating the interior of said boiler vessel with said annular area within said heat exchange vessel;

a heat exchange conduit within said heat exchange vessel having an inlet and extending exteriorly of said heat exchange vessel and an outlet end communicating with the interior of said boiler vessel, the inlet end providing a wet glycol inlet to the reboiler, the heat exchange conduit being coiled around said tubular vessel in said annular area within said heat exchange vessel; and a dehydrated glycol outlet means communicating with the interior of said tubular vessel.

2. A reboiler according to claim 1 including:

an elongated glycol injector tube positioned within the lower portion of said boiler vessel, the glycol injector tube having small spaced apart openings therein, said heat exchange conduit outlet end being connected to said glycol injector tube.

3. A reboiler according to claim 1 including a downpipe having an inlet adjacent the interior upper portion of said boiler vessel and extending downwardly through the boiler vessel wall, the outlet being in said annular area between the exterior of said tubular vessel and the interior of said heat exchange vessel.

4. A reboiler according to claim 3 including an upstanding distribution pipe within said tubular vessel, the lower end of which extends through the tubular vessel to communicate with the annular area exteriorly of said tubular vessel, said dehydrated glycol outlet communicating with the lower interior of said tubular vessel, the dehydrated glycol flowing from said reboiler vessel downwardly through said downpipe into said annular area, then upwardly through said upstanding distribution pipe to be discharged within said tubular vessel, the dehydrated glycol flowing out through said dehydrated glycol outlet.

* * * * *